3,313,779
RESIN CARRYING ALDEHYDE BOUND
CHELATOR
Le Roy A. White, Root Road, Somers, Conn. 06071
No Drawing. Filed Apr. 6, 1964, Ser. No. 357,811
20 Claims. (Cl. 260—59)

This is a continuation-in-part of application Ser. No. 765,924, filed Oct. 8, 1958, and now abandoned.

The present invention relates to ion exchange resins, and, more particularly, to ion exchange resins which comprise a chelating molecule attached to a resin or polymer through the reaction of an aldehyde type compound.

Ion exchange resins are known and are commercially available for a variety of uses. Many commercial operations require water or water solutions which are substantially free of trivalent cations, such as ferric ions; monovalent cations, such as sodium, however, are often not objectionable in such operations. The prior art methods of removing multivalent cations from aqueous solutions embody the following materials:

(1) Sulfated or carboxylated insoluble resins;
(2) Inorganic siliceous materials;
(3) Sequestering agents.

These materials suffer from the following defects:

(1) Sulfated and carboxylated insoluble resins, such as sulfated styrene/divinyl benzene copolymers, sulfated coal and crosslinked polyacrylic acid, indiscriminately remove all cations from solution rather than selectively removing only the multivalent cations. Unnecessary removal of monovalent ions causes the unnecessary expense of regenerating the ion exchange resin more frequently than would be required if only the multivalent ions were removed.

(2) Inorganic siliceous materials, such as zeolites, do not in general suffer from the aforementioned defect. However, their efficiency in preferentially removing multivalent ions is not sufficiently high to justify their use in many processes where they have other disadvantages, e.g., silicates are not used in metals purification procedures since any attempt to leach out absorbed metals will usually destroy the silicate. In addition, the inorganic siliceous materials are readily soluble in water unless the pH is carefully controlled and thus cause procedural difficulties.

(3) Sequestering agents, such as ethylene diamine tetraacetic acid, are useful in many operations where it is necessary to remove multivalent cations. However, such sequestering agents are preferably not used in the manufacture of beverages, such as wine or beer, to prevent the formation of precipitates caused by multivalent cations, since the sequestering agents effectively remove calcium from teeth. Also, where the multivalent cations can enter into chemical reactions, the sequestering agents are of limited effectiveness because they will continuously release the cation to maintain the reaction equilibrium as the cations in solution are consumed.

It is, therefore, an object of this invention to provide ion exchange resins which will remove multivalent cations from solutions in preference to monovalent ions.

It is another object of the present invention to provide a simple, convenient and effective method of synthesis of a sequestering ion exchange resin.

It is another object to produce insoluble resins having far greater affinity for multivalent ions than for monovalent ions which do not suffer from the defects of the prior art, such as those mentioned above.

It is another object of the present invention to provide ion exchange chelating resins by the reaction of an aldehyde type compound.

These and other objects and the nature and advantages of the present invention will be apparent from the following description.

The objects of this invention are attained by attaching a sequestering grouping to a resin or resinifiable material through the intermediate reaction of one component with an aldehyde type compound. This may be accomplished in a number of ways, such as:

(1) By reacting an aldehyde type compound with a sequestering agent and then reacting the product with a resin;

(2) By reacting an aldehyde type compound with a resin and then reacting the resultant active resin with a sequestering agent;

(3) By reacting a resin previously provided with free reactive methylol or methoxy groups with a sequestering agent, procedure (3) being similar to that of procedure (2);

(4) By reacting a sequestering agent with a low molecular weight resinifiable material or monomer, preferably of the aldehyde type, and then polymerizing such as by a homopolymerization, a copolymerization, or a condensation reaction;

(5) By carrying out any of the preceding operations and then crosslinking with heat, acid, or another material; and (6) By forming a cross-linked resin with free inactive methylol-groups thereon and reacting such resin with a sequestering agent, the five previous operations being preferred to this one.

The sequestering agent utilized in the present invention must be aldehyde-reactive and comprise amino, ether, and mixed amino-ether acids having generally two or three amino, ether, or amino-ether coordinating groups, three or more acid groups (i.e., carboxyl, phosphonic, sulfonic, and/or hydroxyl), and a multiplicity of methylene groups between the acid and coordinating groups so arranged that three or more cyclical structures may be formed with the absorbed trivalent metal during use of the resin. Each of these cyclical structures should contain from 5 to 7 units including the metal, the coordinating group and the acid group. As an example a cyclical group in ethylene diamine tetraacetic acid is shown:

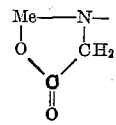

where Me is the trivalent metal.

In each case it is essential in the final product, whether cross-linked or not, that the sequestering groupings be attached to the resin of polymer structure as side-groups and not be itself a link, either linear or cross, between two segments of the resin. If, contrary to the invention, the sequestering grouping becomes a link in the resin between two other segments, it ability to chelate a metallic ion is seriously hampered.

The sequestering agents useful in the present invention fall within the general formula:

$$J-(CXY)_a(CXY)_b(CXY)_c-K$$

wherein J is selected from the group consisting of

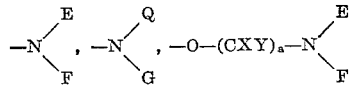

—O—M, and —O—T, wherein X is selected from the group consisting of —H and —(CH$_2$)$_6$COOH; wherein Y is selected from the group consisting of —H, —COOH, and —OH; wherein $a$, $b$, and $c$ are integers of from 0 to 1; wherein K is selected from the same group as J, but is a different member and wherein

and —O—M are never in the same compound together; wherein E, F, and G are selected from the group consisting of —H, —CH$_2$COOH, —CH(COOH)$_2$, —CH$_2$CH$_2$OH, —CH$_2$CH$_2$OCH$_2$CH$_2$OH$_2$,

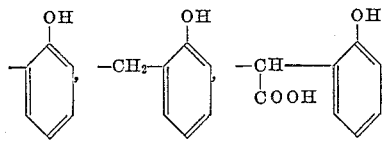

—(CH$_2$)$_p$SO$_3$H, —(CH$_2$)$_p$PO$_3$H$_2$, and not more than one unit of

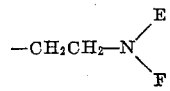

per sequestering agent molecule; wherein Q is selected from the group consisting of —H and

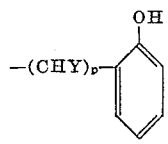

wherein $p$ is an integer of from 0 to 2; wherein M is selected from the group consisting of

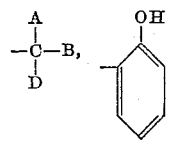

and

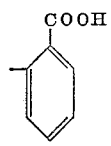

wherein T is selected from the group consisting of

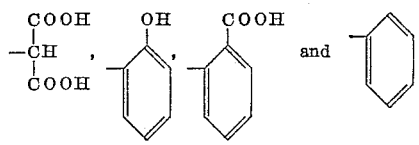

and wherein A, B and D are selected from the group consisting of —H, —COOH,

—CH$_2$COOH, —SO$_3$H, —PO$_3$H$_2$, CH$_2$PO$_3$H$_2$, —CH$_2$SO$_3$H,

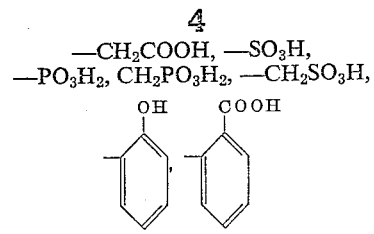

and not more than one unit per sequestering molecule of —(CHY)$_a$—O—M among A, B and D.

An exception to the general formula, which is also useful, is the sequestering agent amino diacetic acid.

It is essential that these compounds be aldehyde-reactive and contain at least one of the groups $$-\underset{|}{N}-H, \quad -CH(COOH)_2$$

or

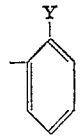

Some of the specific sequestering agents falling within the above general formula are: ethylene diamine triacetic acid; ethylene diamine diacetic acid; N-mono-ethoxy ethylene diamine diacetic acid; ethylene diamine di-(O-hydroxy-phenyl acetic acid); ethylene diamine diacetic acid methylene phosphonic acid; ethylene diamine acetic acid dimethylene phosphonic acid; diethylene-triamine tetracetic acid; ethylene diamine diacetic acid ethylene sulfonic acid; diethylene glycol dimalonate ether; ethylene diamine acetic acid diethylene sulfonic acid;

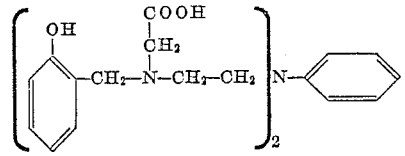

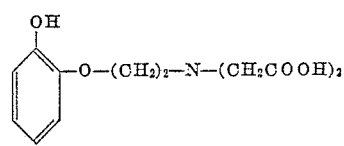

(COOH)$_2$CH—O—(CH$_2$)$_2$—N—(CH$_2$COOH)$_2$

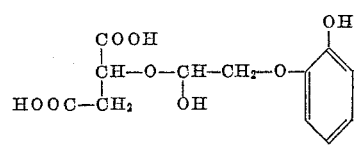

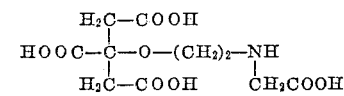

and

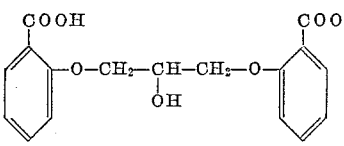

These and the many other sequestering agents falling within the general formula are reacted to form chelating resins through an intermediate aldehyde type reaction.

The aldehyde type compounds used in the present invention as a means of forming a linkage between the resin or resinifiable material and the sequestering agent are compounds which engage in the same type of reactions as aldehydes. These compounds include the aldehydes, including the mono-, di- and tri-functional aldehydes having no greater than 54 carbon atoms; the reactive methylol compounds, i.e. those activated by a ring structure or nitrogen; the reactive methoxy compounds (viz. methoxy methylol or methyl methylol); compounds which revert to aldehyde form in acid media; and low molecular weight resinifiable materials having free reactive methylol groups thereon. However, the lower the molecular weight of the aldehyde type compound used to bond the sequestering agent to the resin, the better will be the overall ion exchange capacity of the final chelating resin, unless the aldehyde type compound itself can be resinified or polymerized into a high molecular weight resin, such as by co-polymerization, condensation with another material, or by cross-linking with heat or acid.

Some of the aldehydes which fall within the broad group of aldehyde type compounds useful in the present invention are: formaldehyde, acetaldehyde, glyoxyl; glutaraldehyde, pyruvic aldehyde, cinnamaldehyde, propionaldehyde, butyraldehyde, isobutyraldehyde, valeraldehyde, citral, acrolein, crotonaldehyde, mucochloric acid, 3-cyclohexene-1-carboxaldehyde, 3-(methylthio) propionaldehyde, benzaldehyde, furfural, piperonal, p-chlorobenzaldehyde, napthaldehyde, etc.

Materials which revert to aldehydes in acid media include: bisulfite addition products such as formaldehyde bisulfite and acetaldehyde bisulfite; cyclic aldehydes such as paraldehyde; paraformaldehyde; ammonia adducts such as acetaldehyde-ammonia; hemiacetals such as ethanol-formaldehyde; and acetals such as acetaldehyde diethyl acetal.

Methylol and methoxy compounds useful as aldehyde type compounds, also later referred to as aldehyde compounds, include: phenolic methylols such as trimethylol phenol, dimethylol phenol, low-molecular weight phenol-formaldehyde polymers, and acetaldehyde-phenol; methylol melamines such as hexamethylol melamine, hexamethoxy methyl melamine, low-molecular weight melamine-aldehyde polymers, low-molecular weight butylated-formaldehyde-melamine; methylol ureas such as dimethylol urea, low-molecular weight urea polymers, dimethylol thiourea and low-molecular weight methanol-butanol-formaldehyde urea resin; and methylol anilines such as low-molecular weight polymers of aniline-formaldehyde and phenol-aniline-formaldehyde.

The resinous or resinifiable materials useful in the present invention—whether (1) already polymerized when reacted with the aldehyde type compound or the aldehyde-sequestering agent product or (2) in low molecular or monomeric form prior to resinification or polymerization to higher molecular weight, such as by copolymerization, condensation with another material or cross-linking— must be aldehyde-reactive, capable of being water-insolubilized, and contain phenoxyl, imino, amino, and/or hydroxyl groupings. As indicated above, if the resin or resinifiable material contains free reactive methylol groups extending from the resin, such methylol groups will act as the aldehyde bonding means for attaching the sequestering agent to the resin or resinifiable material without a third reactant.

Specific resins, monomers and/or resinifiable materials useful in the present invention include phenol-formaldehyde, polyethylenimine, aniline-formaldehyde, melamine-formaldehyde, urea - formaldehyde, thiourea - aldehyde, polyvinyl benzyl amine, polyvinyl alcohol, phenol-formaldehyde-polyvinyl alcohol resin matrix, phenol-aniline-formaldehyde, methylcellulose, cellulose monoacetate, methyl methylol derivative of 6,6 nylon, methyl methylol derivative of 6 nylon, etc.

In the preferred embodiments the above aldehyde-reactive resins which are also hydrophilic, such as polyvinyl alcohol, methyl cellulose and cellulose monoacetate, are preferably utilized in admixture with the other above resins not water soluble in proportions of no greater than 35% and preferably in proportions around 20%, depending on the resin properties desired between wet strength, leaching rate and brittleness. One such mixture is the above-mentioned phenol-formaldehyde-polyvinyl-alcohol resin matrix. This does not mean to say that the aldehyde-reactive hydrophilic resins cannot be used alone, but only that it is preferred that they be mixed with the hydrophobic resins.

Generally, after the formation of the resin containing side chains comprising sequestering groupings, it is desirable to cross-link the resin to obtain a final insoluble and cross-linked ion exchange chelating resin. This can be accomplished in a number of ways depending on the nature of the resin itself. Thus, a phenol-formaldehyde sequestering resin may be cross-linked by the addition of acid or further aldehyde and heating. Polyethylenimine may be cross-linked with epichlorohydrin. Essentially, the resins may be cross-linked in manners known in the art. If an excess of aldehyde type compound is used over that required to link the sequestering agent to the resin, this excess may act to cross-link the resin.

Resins previously cross-linked and having free reactive methylol groups thereon may also react with the aldehyde reactive sequestering agents. However, since the sequestering agent cannot readily penetrate the interior of the cross-linked resin, the reaction takes place essentially on the surface of the resin giving a sequestering resin with a lower chelating ability.

The following examples are intended only to illustrate the invention and are not intended as being limitative in any way.

*Example 1*

As a typical example, a sequestering material is prepared by reacting 2 moles of salicylic acid with 1 mole of epichlorohydrin in an alkaline medium to form the sequestering agent:

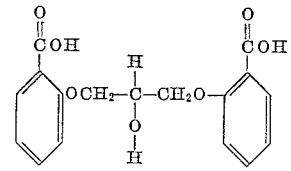

This compound is then reacted further in alkaline media with formaldehyde. This methylol derivative

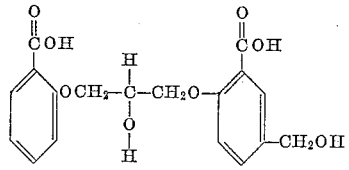

is then added to an alkaline solution of a phenol-formaldehyde novolak polymer and heated. Formaldehyde is then added and the resin is heated and cross-linked by acid addition. The resin is then heated to remove water. The resultant ion exchange chelating resin has a plurality of repeating units of the formula:

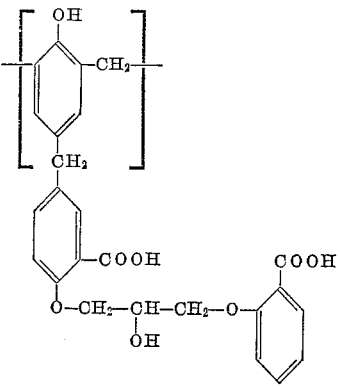

The resion is found to be an excellent ion exchange chelating resin.

Example 2

As another example, diethylene glycol is reacted with lithium and then reacted further with mono-bromo-diethyl malonate. The resulting material, diethylene glycol dimalonate ether, is then hydrolyzed with caustic and in a mildly alkaline media is reacted with a slight excess of glutaraldehyde at 5° C. Polyethylenimine is then added and the solution heated. Epichlorohydrin is then added to cross-link the resin. Water is evaporated and the resin is ground to the desired particle size. The reaction proceeds as follows:

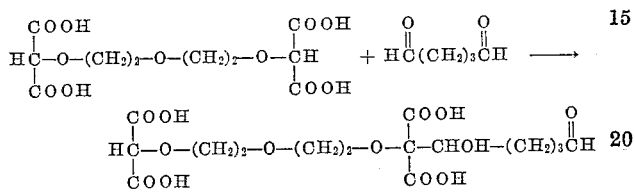

The resultant sequestering aldehyde then reacts with the polyethylenimine to form a resin having repeating units of the formula:

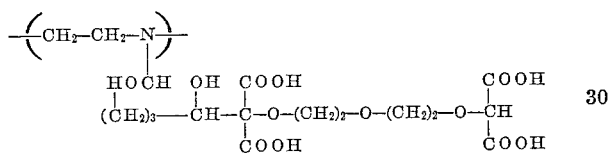

The epichlorohydrin effects cross-linkage between ethyleneimine units not having a sequestering side chain thereon. The resultant ion exchange resin has excellent chelating properties.

Example 3

Utilizing a procedure similar to that of Example 1, 1 mole of the sequestering agent

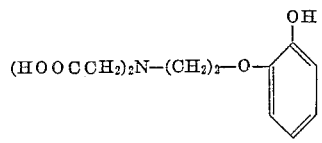

is reacted with 1.03 moles of glyoxal to yield the product

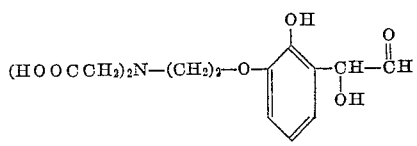

This, in turn, is reacted with 2 moles of phenolformaldehyde resin (based on the monomers) to yield a sequestering resin having a plurality of repeating units of the formula:

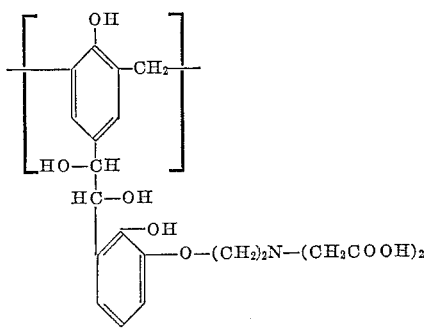

Cross-linking is then effected by adding excess formaldehyde and heating.

Example 4

Following the procedure of Example 1, 1.05 moles of pyruvic aldehyde are reacted with 1 mole of the sequestering agent ethylene diamine triacetic acid to yield the product

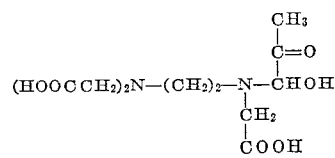

This, in turn, is reacted with 1.2 moles of aniline-formaldehyde resin to yield a sequestering resin having a plurality of repeating units of the formula:

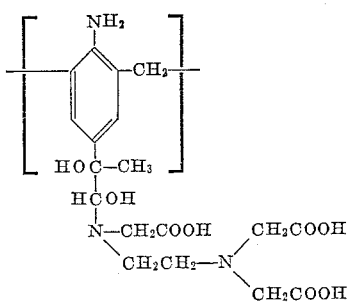

Example 5

Following the procedure of Example 2, 1 mole of the sequestering agent

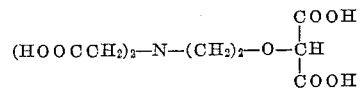

and 1.03 moles of glutaraldehyde are reacted to form

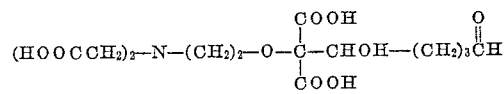

which in turn is reacted with 2 moles of melamine-aldehyde resin to yield a sequestering resin having a plurality of repeating units of the formula

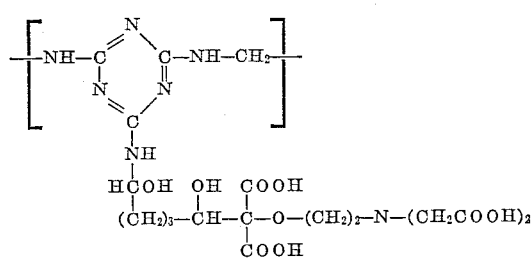

Example 6

Following the procedure of Example 1, 2 moles of the sequestering agent

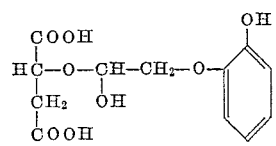

are reacted with 1 mole of hexamethyl methylol melamine (hexamethoxy methyl melamine) to form

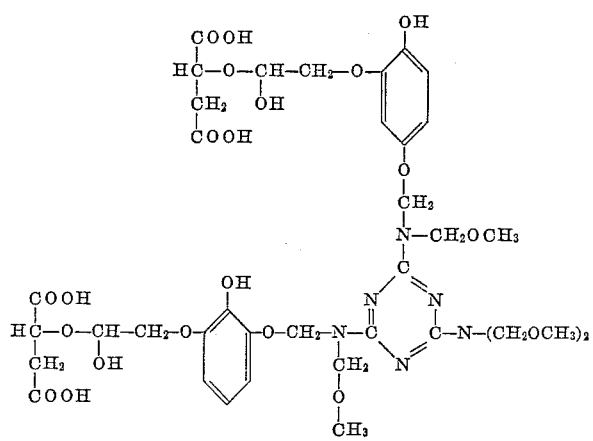

which in turn is reacted with 1½ moles of urea-formaldehyde resin to yield an insoluble ion exchange chelating resin having a plurailty of repeating units of the formula

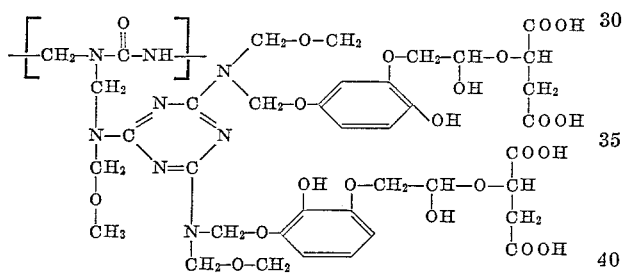

as well as other repeating units such as

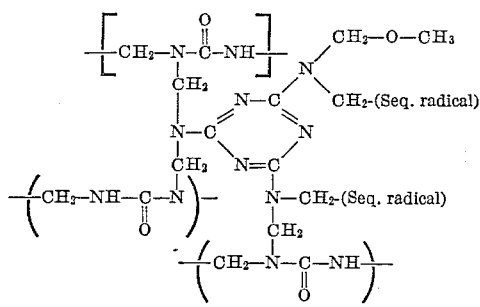

Example 7

As an alternate procedure 1 mole of phenol is reacted under controlled conditions with 1.8 moles of formaldehyde to provide a phenol-formaldehyde resin having free reactive methylol groups extending from the polymer chain, such chain having a plurality of repeating groups of the formula

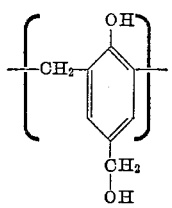

This, in turn, is reacted with 0.8 mole of the sequestering agent

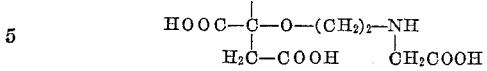

to yield a sequestering resin having a plurality of repeating units of the formula

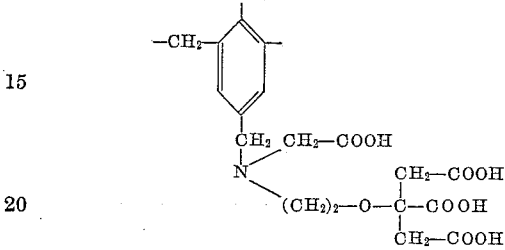

Example 8

As another procedure, 1 mole of polyvinyl benzyl amine is mixed with 0.5 mole of polyethylenimine. The mixture is first reacted with 1 mole of acetaldehyde and then copolymerized. The resultant polymer has free reactive methylol groups extending from the polymer chain. The polymer is then reacted with 1 mole of the sequestering agent N-monoethoxy ethylene diamine diacetic acid to obtain a sequestering resin. The resin is cross-linked by the addition of an excess of acetaldehyde and heat.

Example 9

According to another procedure, 1.5 moles of low-molecular weight phenol-formaldehyde (based on the monomers) is reacted with 1 mole of the sequestering agent ethylene diamine-diacetic acid. The resultant product is then cross-linked by the addition of heat and excess formaldehyde.

Example 10

Three moles of a relatively high molecular weight urea-formaldehyde resin (based on the monomers) having free reactive methylol groups extending from the polymer chain and having little or no cross-linkage is reacted with 2 moles of ethylene diamine triacetic acid. The resultant sequestering resin is divided into two parts. The first part is further cross-linked under the action of heat and acid. Both portions function as excellent ion exchange resins although the first part is less soluble.

Example 11

The procedure of Example 1 is again carried out using 1 mole of the sequestering agent ethylene diamine di-(O-hydroxy-phenyl acetic acid) and 1.03 moles (based on the monomers) of low-molecular weight butylated-formaldehyde-melamine having free reactive methylol groups as the aldehyde-type compound. The product is then reacted with phenol-formaldehyde polymer as described in Example 1.

Example 12

The procedure of Example 9 is carried out using 1 mole of the sequestering agent

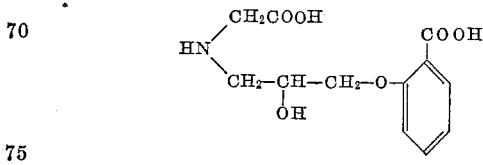

and 2 moles of low-molecular weight phenol-formaldehyde to yield a resin having a plurality of the repeating units

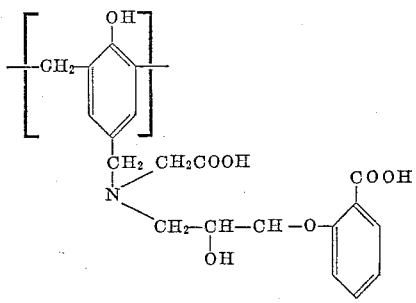

This is cross-linked to an insoluble form by heating.

*Example 13*

The procedure of Example 1 is followed using as a sequestering agent 1½ moles of

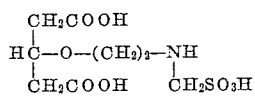

as an aldehyde type compound 1½ moles of formaldehyde; and as an aldehyde-reactive resin a mixture of ½ mole of polyvinyl alcohol and 1½ moles of phenol-formaldehyde resin. The resultant sequestering resin is cross-linked and contains the repeating units:

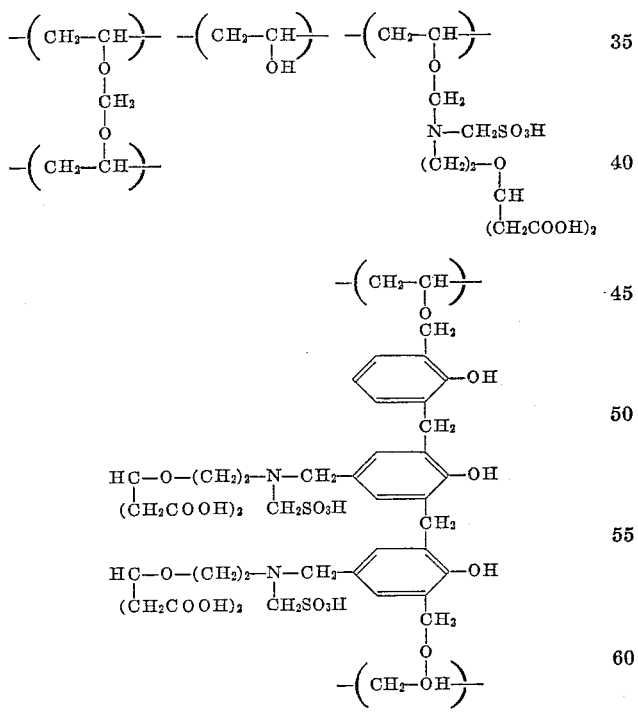

*Example 14*

The procedure of Example 1 is followed using as a sequestering agent ½ mole of

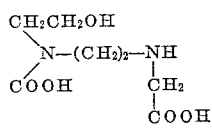

as an aldehyde ½ mole of formaldehyde; and as a resin a mixture of ½ mole of phenol-formaldehyde resin and ¾ mole of polyethylenimine. The resultant sequestering resin is cross-linked and contains the repeating units:

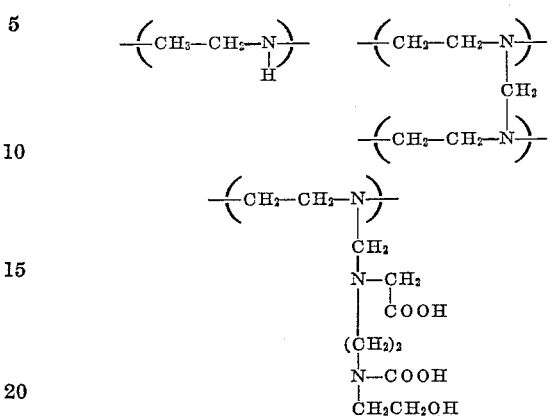

and

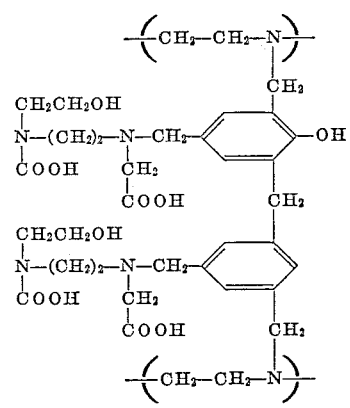

*Example 15*

The procedure of Example 1 is followed using 1 mole of diethylene triamine tetracetic acid; 1.03 moles of acetaldehyde; and a 1.5 mole mixture of 30% polyvinyl alcohol and 70% phenol-formaldehyde (PVOH-P-F matrix).

*Example 16*

The procedure of Example 1 is followed using 1 mole of

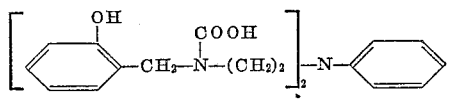

as sequestering agent; 1.05 moles of glyoxal; and 1.6 moles of a mixture of 50% methyl cellulose and 50% phenol-formaldehyde resin.

*Example 17*

The procedure of Example 1 is followed using 1 mole of amino diacetic acid; 1.05 moles of formaldehyde; and 1.8 moles of a mixture of 20% cellulose monoacetate and 80% phenol-formaldehyde.

All the above examples produce ion exchange chelating resins of exceptional chelating ability.

It will be obvious to those skilled in the art that various changes may be made without departing from the spirit of the invention and therefore the invention is not limited to what is described in the specification, but only as indicated in the appended claims.

What is claimed is:
1. A chelating resin comprising the reaction product of (A) an aldehyde compound having no more than 54 carbon atoms; (B) an aldehyde-reactive sequestering agent containing at least one of the groups >NH, —CH(COOH)₂ and

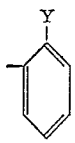

and having the formula

J—(CXY)ₐ(CXY)ᵦ(CXY)ᴄ—K wherein J is selected from the group consisting of

—O—M, and —O—T
wherein X is selected from the group consisting of —H and —(CH₂)₆COOH;
wherein Y is selected from the group consisting of —H, —COOH, and —OH;
wherein $a$, $b$, and $c$ are integers of from 0 to 1;
wherein K is selected from the same group as J, but is a different member and wherein

and —O—M are never in the same compound together;
wherein E, F, and G are selected from the group consisting of —H, —CH₂COOH, —CH(COOH)₂, —CH₂CH₂OH, —CH₂CH₂OCH₂CH₂OH,

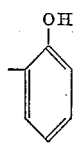 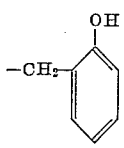 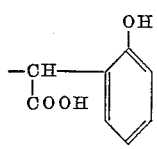

(CH₂)ₚSO₃H, —(CH₂)ₚ PO₃H₂, and not more than one unit of

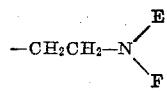

per sequestering agent molecule;
wherein Q is selected from the group consisting of —H and

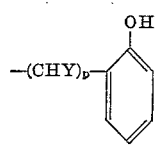

wherein $p$ is an integer of from 0 to 2;
wherein M is selected from the group consisting of

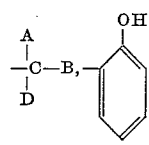

and

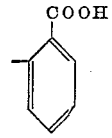

wherein T is selected from the group consisting of

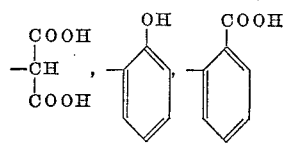

and

and wherein A, B and D are selected from the group consisting of

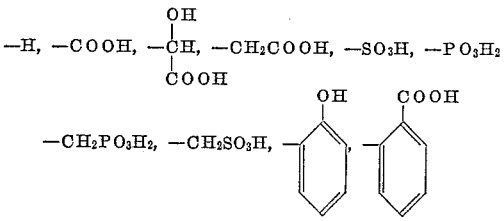

and not more than one unit per sequestering molecule of —(CHY)ₐ—O—M among A, B and D; and (C) an aldehyde-reactive water-insolubilizable resin containing a plurality of groupings of the members selected from the group consisting of phenolic, imino, amino and hydroxyl, said aldehyde compound forming a linkage between said resin and said sequestering agent, the sequestering component of the resultant chelating resin being pendant as side chains from said resin.

2. A chelating resin comprising the reaction product of (A) an aldehyde compound selected from the group consisting of formaldehyde, acetaldehyde, glyoxyl, glutaraldehyde, hexamethylol melamine and pyruvic aldehyde; (B) the sequestering agent

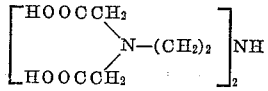

and (C) a phenol formaldehyde-polyvinyl alcohol resin matrix.

3. A chelating resin comprising the reaction product of (A) an aldehyde compound selected from the group consisting of formaldehyde, acetaldehyde, glyoxyl, glutaraldehyde, hexamethylol melamine and pyruvic aldehyde; (B) the sequestering agent

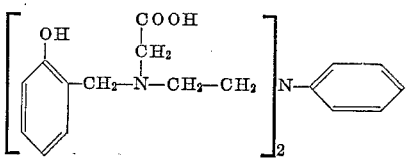

and (C) a phenol formaldehyde-polyvinyl alcohol resin matrix.

4. A chelating resin comprising the reaction product of (A) an aldehyde compound selected from the group consisting of formaldehyde, acetaldehyde, glyoxyl, glutaraldehyde, hexamethylol melamine and pyruvic aldehyde; (B) the sequestering agent (HOOC—CH₂)₂NH; and (C) phenol formaldehyde-polyvinyl alcohol matrix.

5. A chelating resin comprising the reaction product of a resin having free reactive methylol groups and an aldehyde-reactive sequestering agent containing at least one of the groups >NH, —CH(COOH)₂ and

and having the formula $$J-(CXY)_a-K$$

where in J, X, Y, a, and K are the same as in claim 1, at least some of said free reactive methylol groups reacting with said sequestering agent to form a linkage between said resin and said sequestering agent, the sequestering component of the resultant chelating resin being pendant as side chains from said resin.

6. A chelating resin having a plurality of repeating units of the formula:

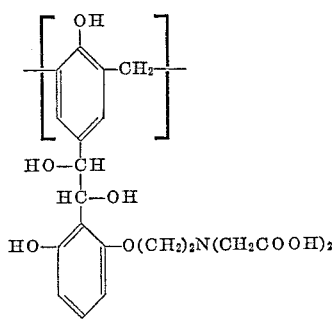

7. A chelating resin having a plurality of repeating units of the formula:

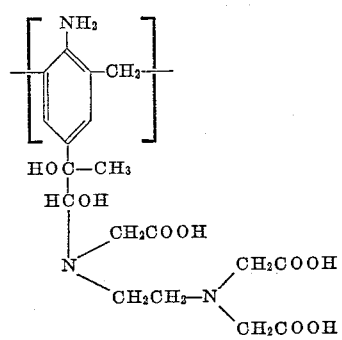

8. A chelating resin having a plurality of repeating units of the formula:

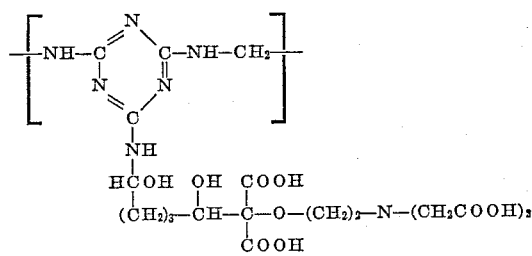

9. A chelating resin having a plurality of repeating units of the formula:

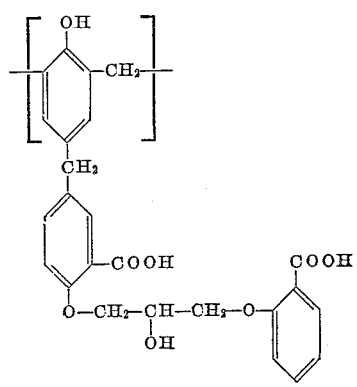

10. A chelating resin having a plurality of repeating units of the formula:

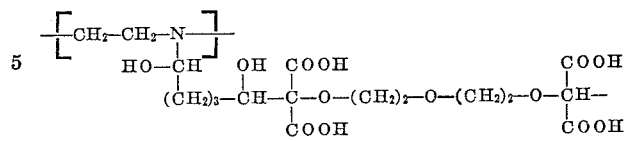

11. A chelating resin having a plurality of repeating units of the formula:

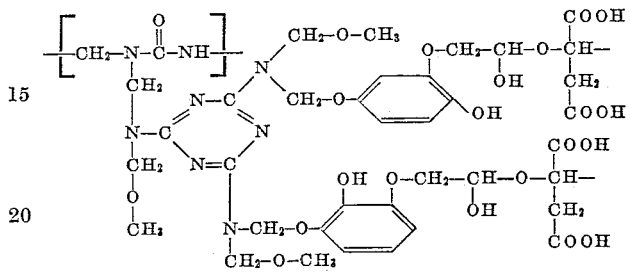

12. A chelating resin having a plurality of repeating units of the formula:

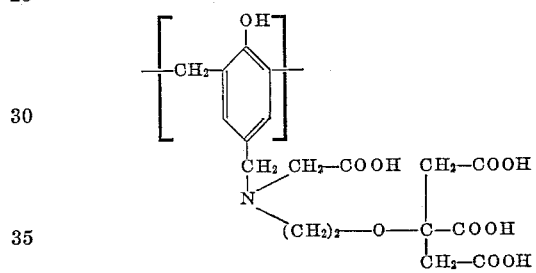

13. A chelating resin having a plurality of repeating units of the formula:

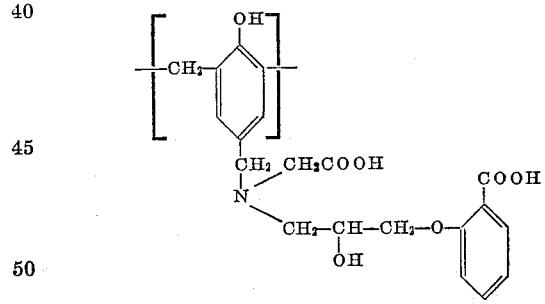

14. A chelating resin having a plurality of repeating units of the formula:

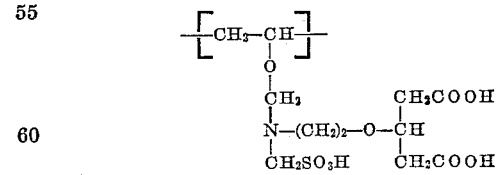

15. A chelating resin having a plurality of repeating units of the formula:

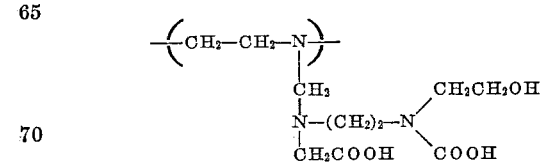

16. A chelating resin comprising the reaction product of (A) an aldehyde compound having no more than 54 carbon atoms; (B) an aldehyde reactive sequestering agent containing at least one of the groups >NH, —CH(COOH)$_2$ and

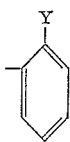

and having the formula J—(CXY)$_a$(CXY)$_b$(CXY)$_c$—K, wherein J, X, Y, K, $a$, $b$ and $c$ are as defined in claim 1; and (C) a phenolic resin containing hydroxyl groups, said aldehyde compound forming a linkage between said phenolic resin at at least some of said hydroxyl groups and said sequestering agent, the sequestering component of the resultant chelating resin being pendant as side chains from said resin.

17. A chelating resin comprising the reaction product of (A) an aldehyde compound having no more than 54 carbon atoms; (B) an aldehyde reactive sequestering agent containing at least one of the groups >NH, —CH(COOH)$_2$ and

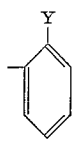

and having the formula J—(CXY)$_a$(CXY)$_b$(CXY)$_c$—K, wherein J, X, Y, K, $a$, $b$ and $c$ are as defined in claim 1; and (C) an aminoplast resin, said aldehyde compound forming a linkage between said aminoplast resin and said sequestering agent, the sequestering component of the resultant chelating resin being pendant as side chains from said resin.

18. A chelating resin comprising the reaction product of (A) an aldehyde compound having no more than 54 carbon atoms; (B) an aldehyde reactive sequestering agent containing at least one of the groups >NH, —CH(COOH)$_2$ and

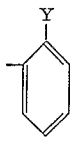

and having the formula J—(CXY)$_a$(CXY)$_b$(CXY)$_c$—K, wherein J, X, Y, K, $a$, $b$ and $c$ are as defined in claim 1; and (C) a polyol resin, said aldehyde compound forming a linkage between said polyol resin and said sequestering agent, the sequestering component of the resultant chelating resin being pendant as side chains from said resin.

19. A chelating resin comprising the reaction product of (A) an aldehyde compound having no more than 54 carbon atoms; (B) an aldehyde reactive sequestering agent containing at least one of the groups >NH, —CH(COOH)$_2$ and

and having the formula J—(CXY)$_a$(CXY)$_b$(CXY)$_c$—K, wherein J, X, Y, K, $a$, $b$ and $c$ are as defined in claim 1; and (C) polyethyleneimine, said aldehyde compound forming a linkage between said resin and said sequestering agent, the sequestering component of the resultant chelating resin being pendant as side chains from said chelating resin.

20. A chelating resin comprising the reaction product of (A) an aldehyde compound having no more than 54 carbon atoms; (B) a sequestering agent selected from the group consisting of

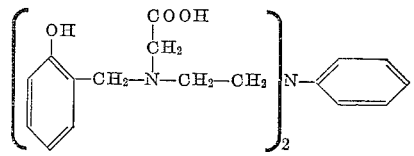

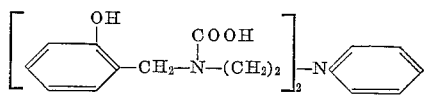

and (C) an aldehyde-reactive water-insulubilizable resin containing a plurality of groupings of the members selected from the group consisting of phenolic, imino, amino and hydroxyl, said aldehyde compound forming a linkage between said resin and said sequestering agent, the sequestering component of the resultant chelating resin being pendant as side chains from said chelating resin.

References Cited by the Examiner

Gregor, H. P., et al.: Ind. Eng. Chem. 44, 2834–9 (1952), TP1A58. (Copy in Scientific Library.)

Hale: Research, vol 9 (1956), pp. 104–108, Butterworth's Scientific Publications, London.

WILLIAM H. SHORT, *Primary Examiner.*

C. A. WENDEL, *Assistant Examiner.*